United States Patent
Watanabe et al.

(10) Patent No.: US 9,261,698 B2
(45) Date of Patent: Feb. 16, 2016

(54) OPTICAL SCANNER AND IMAGE FORMING APPARATUS INCLUDING SAME

(75) Inventors: Kazunori Watanabe, Tokyo (JP);
Keiichi Serizawa, Kanagawa (JP);
Hiroshi Johno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 384 days.

(21) Appl. No.: 13/601,249

(22) Filed: Aug. 31, 2012

(65) Prior Publication Data

US 2013/0106971 A1 May 2, 2013

(30) Foreign Application Priority Data

Oct. 26, 2011 (JP) .................................. 2011-235324
May 31, 2012 (JP) .................................. 2012-124216

(51) Int. Cl.
*G02B 26/12* (2006.01)
*B41J 2/44* (2006.01)
*B41J 2/45* (2006.01)
*B41J 2/47* (2006.01)

(52) U.S. Cl.
CPC ............... *G02B 26/124* (2013.01); *B41J 2/442* (2013.01); *B41J 2/451* (2013.01); *B41J 2/473* (2013.01); *G02B 26/121* (2013.01); *G02B 26/123* (2013.01)

(58) Field of Classification Search
CPC .......... B41J 2/442; B41J 2/451; G02B 26/124
USPC .................................. 347/138, 152, 245, 263
See application file for complete search history.

(56) References Cited

U.S. PATENT DOCUMENTS

| | | | | |
|---|---|---|---|---|
| 2001/0014108 A1* | 8/2001 | Naoe | ...................... | 372/29.014 |
| 2002/0075916 A1* | 6/2002 | Sato et al. | ...................... | 372/36 |
| 2005/0093968 A1* | 5/2005 | Iwamoto | ...................... | 347/238 |
| 2006/0209162 A1* | 9/2006 | Choi et al. | ...................... | 347/224 |

FOREIGN PATENT DOCUMENTS

| | | |
|---|---|---|
| JP | 2006-326901 | 12/2006 |
| JP | 2009-115870 | 5/2009 |
| JP | 2010-175688 | 8/2010 |
| JP | 2011-043690 | 3/2011 |

* cited by examiner

*Primary Examiner* — Kristal Feggins
*Assistant Examiner* — Kendrick Liu
(74) *Attorney, Agent, or Firm* — Harness, Dickey & Pierce, P.L.C.

(57) ABSTRACT

An optical scanner includes a light source for projecting a light beam against a target, a deflector for deflecting the light beam, a coupling lens, an optical element, a light source support member, and a housing. The coupling lens directs the light beam to the deflector. The optical element focuses the light beam deflected by the deflector into a desired shape. The light source support member supports the light source. The housing houses the light source supported by the light source support member, the deflector, and the optical elements. The housing includes at least two coupling lens mounts on which the coupling lens is fixed on an optical path between the light source and the target, and accommodates multiple light source support members. The coupling lens is fixed to the coupling lens mount using an adhesive agent after an optical axis of the light beam is aligned.

11 Claims, 5 Drawing Sheets

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2011-235324, filed on Oct. 26, 2011, and 2012-124216, filed on May 31, 2012, both in the Japan Patent Office, which are hereby incorporated herein by reference in their entirety.

BACKGROUND OF THE INVENTION

1. Field of the Invention

Exemplary aspects of the present disclosure generally relate to an image forming apparatus, such as a copier, a facsimile machine, a printer, or a digital multi-functional system including a combination thereof, and more particularly, to an optical scanner that allows specification changes using common parts and an image forming apparatus including the optical scanner.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical scanner projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Known optical scanners for writing an electrostatic latent image on the surface of the image bearing member include a rotary polygon mirror that deflects and scans a light beam along the main scanning direction of the photosensitive drum.

Such optical scanners include a light source such as a semiconductor laser or the like, a coupling lens, an aperture, a cylindrical lens disposed on a light path between the light source and the rotary polygon mirror, a group of scan lenses including an f-theta lens and a face tangle error correction lens, and mirrors disposed between the scan lens and the photosensitive drum. The group of scan lenses is disposed between the rotary polygon mirror and a scanned surface of the photosensitive drum.

In recent years, there is growing market demand for production of images of ever-higher quality at ever-higher speeds. In order to accommodate such demand, a rotation speed of the rotary polygon mirror is increased from an original standard specification as needed, and the number of semiconductor lasers is increased to form multiple light beams.

When changes are made to the standard specification, configurations of devices need to be also changed to accommodate the changes. More specifically, when increasing the printing speed, an optical unit including multiple semiconductor lasers and a rotary polygon mirror with a higher rotation speed, or a whole new optical scanner is manufactured in addition to the standard devices so that depending on the specification changes, more appropriate devices can be installed in the image forming apparatus.

However, as is obvious, manufacturing a new optical unit and an optical scanner in addition to the standard devices increases manufacturing cost.

In view of the above, for changes in the rotation speed of rotary polygon mirror in particular, the rotary polygon mirror which is normally disposed on a drive circuit board is disposed separately from the drive circuit board, such as in JP-2006-326901-A. Instead, the rotary polygon mirror is attached to a different board (also called dummy board), and the drive circuit board is disposed outside an optical housing enclosing various optical components.

In this configuration, heat generated due to high-speed rotation of the rotary polygon mirror does not adversely affect the drive circuit board and components disposed thereon. Furthermore, the optical housing includes a plurality of circuit board mounts so that when the rotary polygon mirror rotating at higher speed is employed, the drive circuit board can be mounted at a different position to prevent the heat of the rotary polygon mirror from affecting the circuit board.

Although advantageous, in order to achieve high-speed scan with a single beam, a deflector such as the rotary polygon mirror needs to rotate at ever higher speed. Such a deflector capable of rotating fast is generally expensive and generates noise when rotating. Thus, a sound proof shield or the like to reduce noise is required, thus hindering efforts to provide the low-cost image forming apparatuses for which there is market demand.

In view of the above, there is thus demand for an optical writing device capable of accommodating changes from a standard specification without manufacturing new devices.

BRIEF SUMMARY OF THE INVENTION

In view of the foregoing, in an aspect of this disclosure, there is provided an improved an optical scanner including a light source, a deflector, a coupling lens, an optical element, a light source support member, and a housing. The light source projects a light beam against a target. The deflector deflects the light beam projected from the light source. The coupling lens directs the light beam projected from the light source to the deflector. The optical element focuses the light beam deflected by the deflector into a desired shape. The light source support member supports the light source. The housing houses the light source supported by the light source support member, the deflector, and the optical element. The housing includes at least two coupling lens mounts on which the coupling lens is fixed on an optical path between the light source and the target, and accommodates multiple light source support members. The coupling lens is fixed to the coupling lens mount using an adhesive agent after an optical axis of the light beam is aligned.

According to another aspect, an image forming apparatus includes a latent image bearing member, an optical scanner, a developing device, and a transfer device. The latent image bearing member bears an electrostatic latent image on a surface thereof. The optical scanner writes the electrostatic latent image on the latent image bearing member. The developing device develops the electrostatic latent image with toner to form a toner image. The transfer device transfers the toner image on a recording medium. The optical scanner includes a light source, a deflector, a coupling lens, an optical element, a light source support member, and a housing. The light source projects a light beam against a target. The deflector deflects the light beam projected from the light source. The coupling lens directs the light beam projected from the light source to the deflector. The optical element focuses the light beam deflected by the deflector into a desired shape. The light source support member supports the light source. The housing houses the light source supported by the light source support member, the deflector, and the optical element. The housing includes at least two coupling lens mounts on which the coupling lens is fixed on an optical path between the light source and the target, and accommodates multiple light source support members. The coupling lens is fixed to the coupling lens mount using an adhesive agent after an optical axis of the light beam is aligned.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 1 is a schematic diagram illustrating an image forming apparatus employing an optical scanner according to an illustrative embodiment of the present invention;

DETAILED DESCRIPTION OF DISCLOSED EMBODIMENTS

Figure 1:
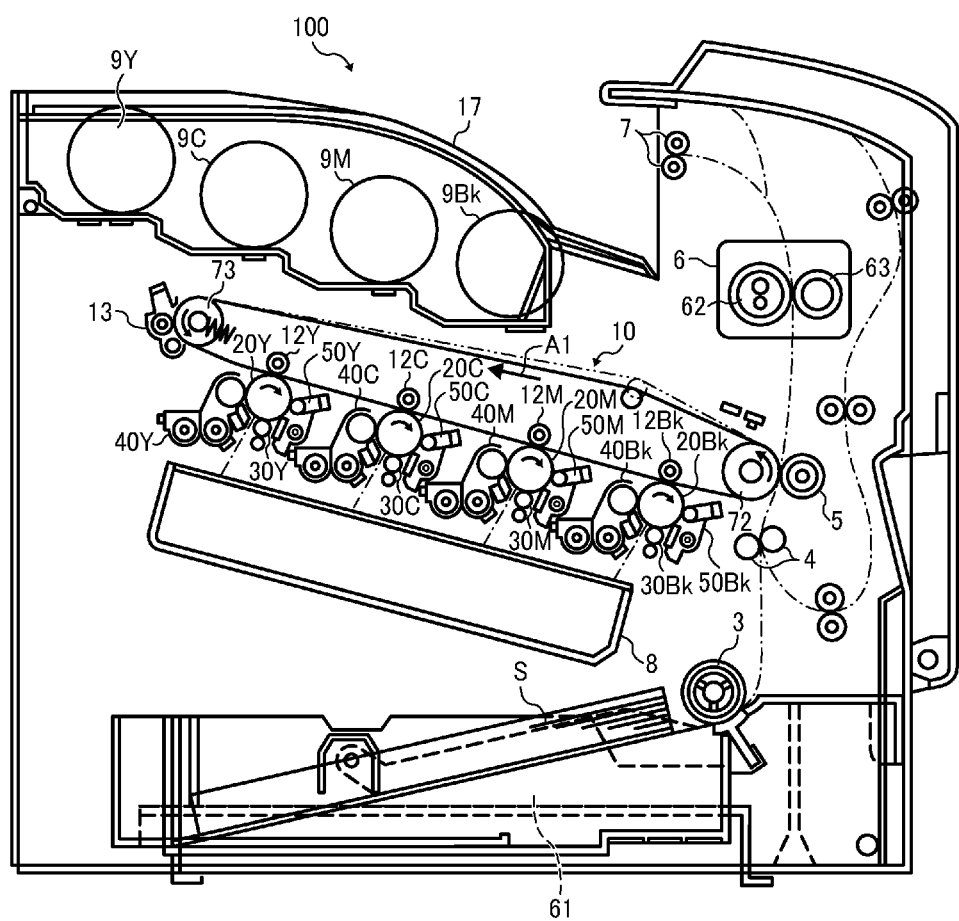
FIG. 1 is

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of an image forming apparatus 100 according to an aspect of this disclosure.

FIG. 1 is a schematic diagram illustrating a color printer as an example of the image forming apparatus 100 employing an optical scanner 8 according to an illustrative embodiment of the present invention. The image forming apparatus 100 includes four image forming stations including photosensitive drums 20Y, 20C, 20M, and 20Bk, one for each of the colors yellow, cyan, magenta, and black, respectively; a transfer belt unit 10 including an intermediate transfer belt 11 and primary transfer rollers 12Y, 12C, 12M, and 12Bk; a secondary transfer roller 5; a belt cleaning device 13; and an optical scanner 8.

The transfer belt unit 10 is disposed above the photosensitive drums 20Y, 20C, 20M, and 20Bk such that the primary transfer rollers 12Y, 12C, 12M, and 12Bk face the photosensitive drums 20Y, 20C, 20M, and 20Bk via the intermediate transfer belt 11. The secondary transfer roller 5 is disposed outside the loop formed by the intermediate transfer belt 11 and rotated by the rotation of the intermediate transfer belt 11. The belt cleaning device 13 is disposed facing the intermediate transfer belt 11 to clean the surface of the intermediate transfer belt 11. The optical scanner 8 serving as an optical writing mechanism is disposed below the image forming stations.

In FIG. 1, the image forming apparatus 100 is a tandem-type color printer in which the plurality of image forming stations, one for each of the colors yellow, cyan, magenta, and black, are arranged in tandem along the intermediate transfer belt 11 serving as an intermediate transfer member.

It is to be noted that the present invention is applicable not only to the printer, but also to a copier, a facsimile, and so forth.

As illustrated in FIG. 1, in the image forming apparatus 100, the photosensitive drums 20Y, 20C, 20M, and 20Bk, each of which serves as an image bearing member, are arranged in tandem along the intermediate transfer belt 10. The photosensitive drums 20Y, 20C, 20M, and 20Bk bear a latent image of yellow, cyan, magenta, and black, respectively.

It is to be noted that the suffixes Y, C, M, and Bk denote colors yellow, cyan, magenta, and black, respectively. To simplify the description, these suffixes Y, C, M, and Bk indicating colors are omitted herein unless otherwise specified.

Latent images formed on the photosensitive drums 20Y, 20C, 20M, and 20Bk are developed with respective color of toner, thereby forming visible images, known as toner images on the surface thereof. The toner images on the photosensitive drums 20Y, 20C, 20M, and 20Bk are transferred onto the intermediate transfer belt 11 moving in the direction indicated by an arrow A1 in FIG. 1 such that they are superimposed one atop the other, thereby forming a composite toner image in a process known as a primary transfer process. Subsequently, the composite toner image is transferred onto a recording medium S in a secondary transfer process.

The intermediate transfer belt 11 is formed into a loop and entrained around a plurality of rollers, a secondary transfer counter roller 72 and a cleaning counter roller 73. The intermediate transfer belt 11 rotates in the direction indicated by arrow A1.

Variety of imaging devices is disposed around each of the photosensitive drums 20Y, 20C, 20M, and 20Bk. The image forming stations including the photosensitive drums 20Y, 20C, 20M, and 20Bk all have the same configurations as all the others, differing only in the color of toner employed. Thus, a description is provided of the imaging devices disposed around the photosensitive drum 20Bk for black.

A charging device 30Bk, a developing device 40Bk, a primary transfer roller 12Bk, and a cleaning device 50Bk are disposed around the photosensitive drum 20Bk in the direction of rotation of the photosensitive drum 20Bk. As will be described later, after charging the photosensitive drum 20Bk by the charging device 30Bk, optical writing is performed by the optical scanner 8.

The toner images are transferred from the photosensitive drums 20Y, 20C, 20M, and 20Bk onto the intermediate transfer belt 11 from the upstream side to the downstream side in the direction of movement of the intermediate transfer belt 11 in the direction of arrow A1 due to application of a voltage by the primary transfer rollers 12Y, 12C, 12M, and 12Bk at different timing so that the toner images are transferred at the same position on the intermediate transfer belt 11. The primary transfer rollers 12Y, 12C, 12M, and 12Bk are disposed inside the loop formed by the intermediate transfer belt 11, facing the photosensitive drums 20Y, 20C, 20M, and 20Bk.

The photosensitive drums 20Y, 20C, 20M, and 20Bk are disposed in this order from the upstream side in the direction of arrow A1. However, the order is not limited to this order.

Toner bottles 9Y, 9C, 9M, and 9Bk are disposed at an upper portion of the image forming apparatus 100 substantially above the intermediate transfer belt 10. The respective color of toner is supplied to the developing devices 50Y, 50C, 50M, and 50Bk as needed via toner transport paths.

A stack of recording media sheets S or transfer sheets is stored in a sheet cassette 61 disposed at the bottom of the image forming apparatus 100. The sheet cassette 61 is equipped with a sheet feed roller 3 which picks up and feeds a top sheet of the stack of the recording media sheets to a pair of registration rollers 4. When the leading edge of the recording medium S reaches the pair of the registration rollers 4, rotation of the registration rollers 4 stops temporarily. The registration rollers 4 start rotating again in appropriate timing such that the composite toner image formed on the intermediate transfer belt 10 in the primary transfer process is aligned with the recording medium S, and the composite toner image is transferred onto the recording medium in a secondary transfer nip between the secondary transfer roller 5 and the intermediate transfer belt 10.

Subsequently, the recording medium on which the composite color toner image is secondarily transferred is delivered to a fixing device 6 equipped with a heating roller 62 and a pressing roller 63, and passes therethrough so that the composite color toner image is fixed onto the recording medium S by heat and pressure in the fixing device 6. After the toner image is fixed, the recording medium is discharged onto a sheet output tray 17 by a pair of sheet discharge rollers 7. The sheet output tray 17 forms an upper surface of the image forming apparatus 100.

Figure 2:
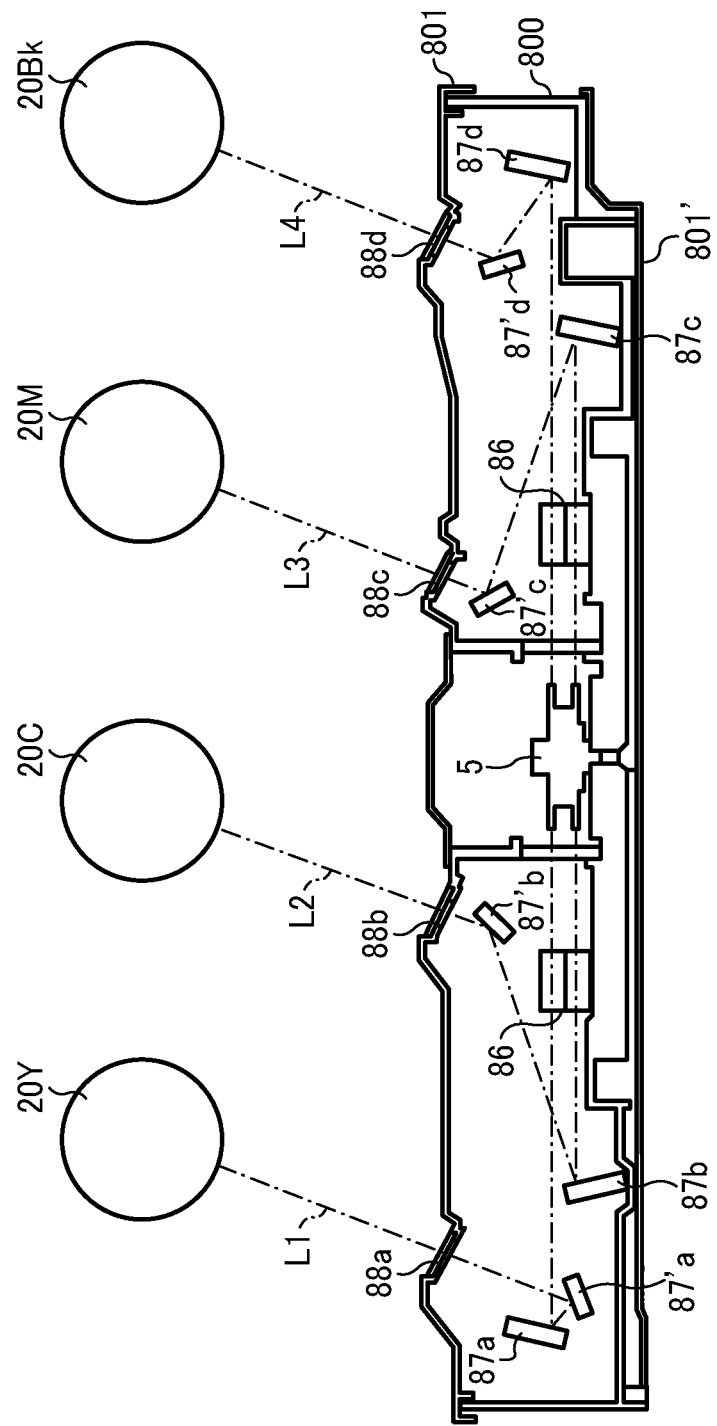
FIG. 2 is a schematic diagram illustrating the optical scanner of FIG. 1.
Figure 3:
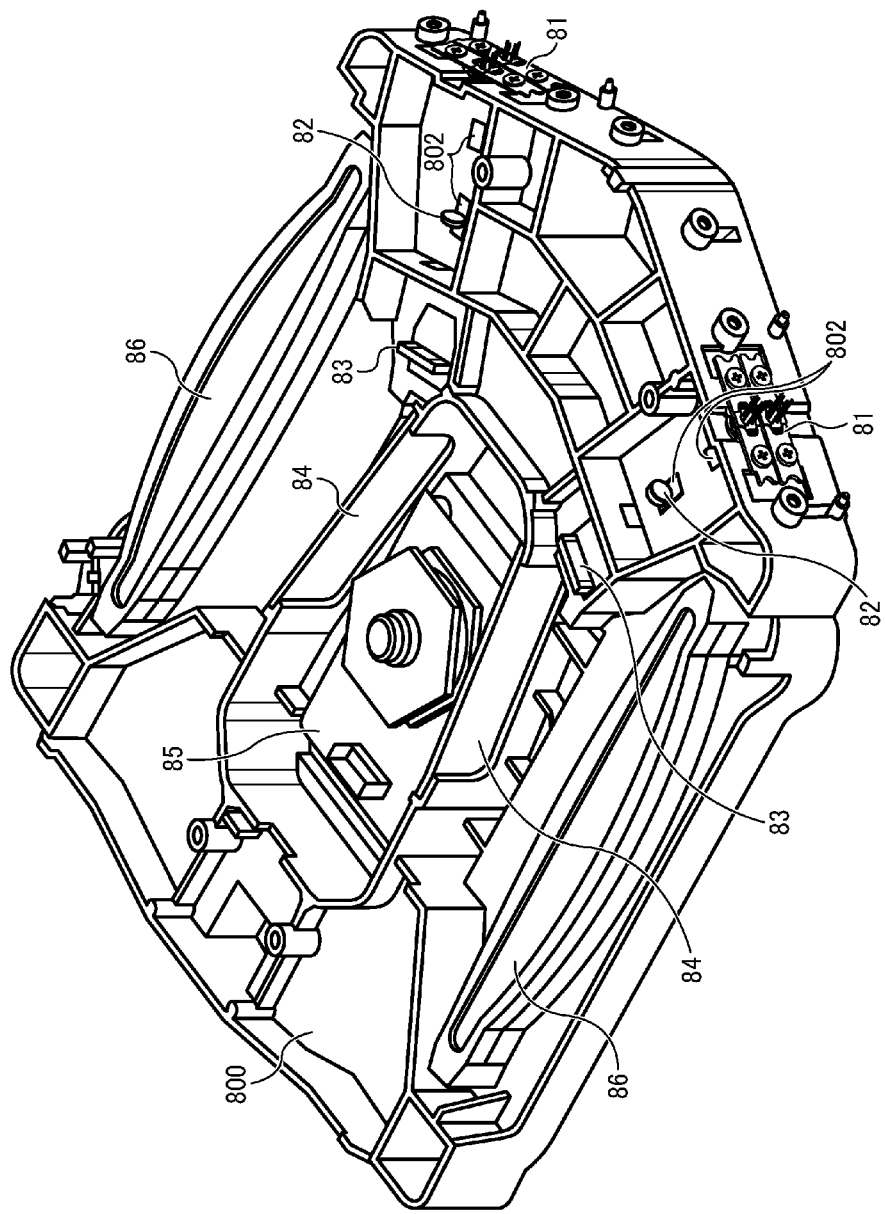
FIG. 3 is a perspective view schematically illustrating components of the optical scanner.

With reference to FIGS. 2 and 3, a description is provided of the optical scanner 8. FIG. 2 is a schematic diagram illustrating the optical scanner 8 of FIG. 1. FIG. 3 is a perspective view schematically illustrating main components of the optical scanner 8.

As illustrated in FIG. 3, the optical scanner 8 includes a housing 800 disposed at an immovable portion of the optical scanner 8. The housing 800 houses a light source unit 81, a coupling lens 82, an aperture, a cylindrical lens 83, a soundproof glass panel 84, a polygon scanner 85, and scan lens 86, reflective mirrors 87a through 87d and 87'a through 87'd (collectively referred to as reflective mirrors 87 and 87'). The light source unit 81 includes a light source 101 (shown in FIG. 4) that projects laser light. The light source 101 is a semiconductor laser (also referred to as LD).

The coupling lens 82 converts diverging rays of laser light projected from the light source 101 into parallel light. The aperture shapes the parallel light into a desired shape. Then, the cylindrical lens 83 focuses the laser light having the desired shape into linear light or in a form of a light beam. The soundproof glass panel 84 seals a place where the polygon scanner 85 is installed. The polygon scanner 85 rotates fast and includes polygon mirrors that deflect and scan the laser light. The scan lens 86 serves as an f-theta lens and a face tangle error correction lens. The reflective mirrors 87 and 87' direct the laser light to the photosensitive drums 20Y, 20C, 20M, and 20BK.

The housing 800 includes a top cover 801 and a bottom cover 801'. The top cover 801 includes dust proof glass panels 88a through 88d (collectively referred to as dust proof glass panels 88) to prevent a foreign substance from coming into the housing 800. In FIG. 2, L1 through L4 indicate light paths to the photosensitive drums 20Y, 20C, 20M, and 20Bk.

A first optical system includes the coupling lens 82 and the cylindrical lens 83 that direct the laser light from the light source to the polygon scanner 85.

Figure 4:
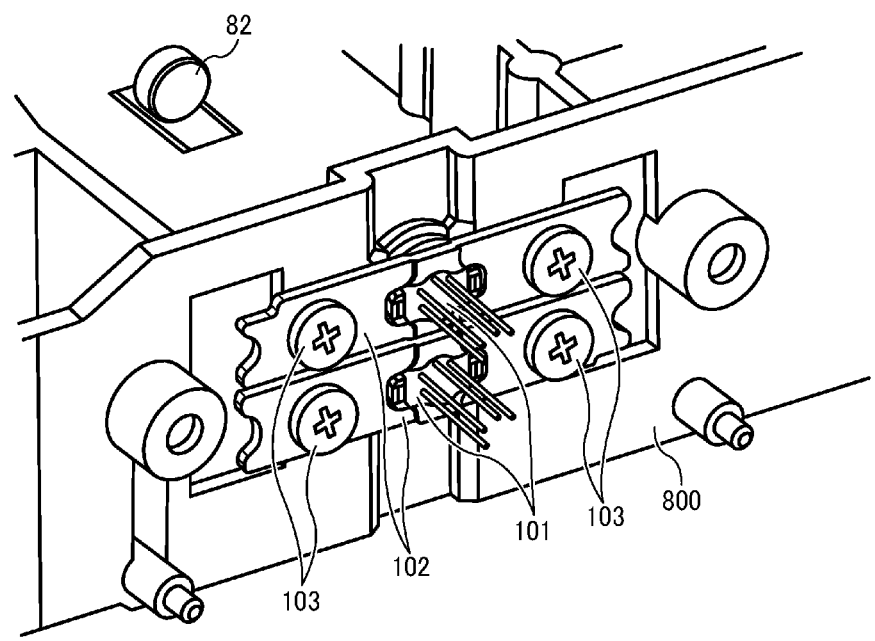
FIG. 4 is a partially enlarged schematic diagram illustrating a light source mount in the optical scanner of FIG. 3.

With reference to FIG. 4, a detailed description is provided of the light source unit 81. FIG. 4 is a partially enlarged schematic diagram illustrating a light source mount of the light source unit 81. As illustrated in FIG. 4, the light source unit 81 includes a light source support member 102 that presses the light source 101 mounted on an LD mount, described later, against the housing 800 at the mounting position.

According to the present illustrative embodiment, in order to enable the light source unit 81 capable of projecting a single beam as a standard configuration to project multiple beams, the light source unit 81 includes mounting space for a plurality of light sources 101. Positioning holes serving also as light projection apertures are formed at each of mounting positions for the light sources 101. The positioning holes are slightly larger than an outer diameter of the light sources 101, thereby allowing rotation of the light source 101.

For both the single beam and the multiple beam configurations, after the position of the light source 101 in the direction of rotation is determined, the light source support member 102 is fastened to the housing 800 using screws 103, thereby pressing the light source 101 against the housing 800. Accordingly, the light source 101 is fixed to the housing 800.

Figure 5:
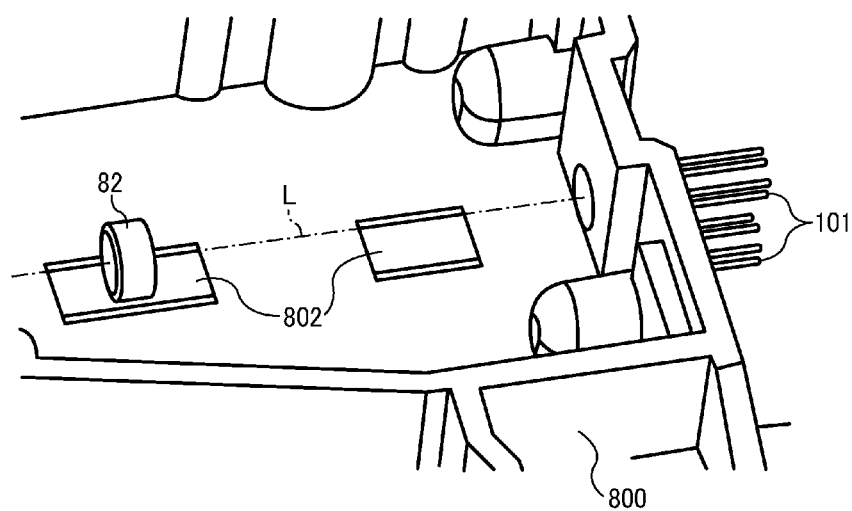
FIG. 5 is a partially enlarged schematic diagram illustrating a coupling lens and a coupling lens mount in the optical scanner.

With reference to FIG. 5, a description is provided installation of the coupling lens 82 of the first optical system. FIG. 5 is a partially enlarged schematic diagram illustrating the coupling lens 82 and a coupling lens mount 802.

The position of the coupling lens 82 is determined by adjusting deviations of the optical axis of the light beam projected from the light source 101. Depending on the degree of deviations of the optical axis, the coupling lens 82 may not be disposed at a predetermined position. Thus, the coupling lens 82 is fixed to the coupling lens mount 802 using an adhesive agent after adjustment. The adhesive agent includes, but is not limited to, an ultraviolet curable resin. After the coupling lens 82 is positioned in place after adjustment of the optical axis, the adhesive agent is cured by ultraviolet radiation while the coupling lens 82 is placed.

As illustrated in FIG. 5, the coupling lens 82 is fixed to the coupling lens mount 802 using the adhesive agent made of ultraviolet curable resin after adjusting the position of the coupling lens 82 to adjust the optical axis. The coupling lens mount 82 is formed substantially in the shape of an arc of a circle, the center of which substantially coincides with the center of the optical axis of the coupling lens 82. The diameter of the coupling lens mount 802 at the housing side is larger by the thickness of the adhesive agent applied thereto than the outer diameter of the coupling lens 82.

As is obvious, since the coupling lens mount 802 is formed substantially in the shape of an arc of a circle, the center of which substantially coincides with the center of the optical axis of the coupling lens 82, the center of the optical axis of the coupling lens 82 disposed on the adhesive agent should not deviate from the optimum optical axis.

The coupling lens mount 802 is provided at two different locations along the optical axis direction indicated by a line L to accommodate coupling lenses having different focal lengths. That is, the coupling lenses 82 having different focal lengths can be selected so that light utilization efficiency can be changed accordingly. For example, the longer the focal length, the lower the ratio of light in a light flux projected from the light source 101 that penetrates through the coupling lens 82, as compared with a short focal length. The light utilization efficiency decreases.

Different light utilization efficiency is selected, because the light intensity required of the optical scanner differs depending on a specification.

There is a limitation in the rotation speed of the polygon scanner 85 of the optical scanner 8. For example, in a case in which there is a change from a standard specification in which a greater productivity which is more than a single beam can accommodate is required, the number of planes of polygon scanner 85 needs to be increased or the number of light beams needs to be increased. The productivity can be increased by increasing the number of light beams while the polygon scanner is rotated slower than when the single beam is employed. In this case, the light intensity required per beam is less.

In a case in which the light intensity is relatively low, the light source 101 does not project light with the laser diode, but instead projects light with an LED. With the LED illumination, a desired beam shape cannot be obtained on a scanned surface.

When increasing the number of light beams, the required light intensity per beam is reduced. This means that in order to obtain reliable LD emission, the light utilization efficiency is reduced so that the similar or the same LD luminous intensity as when using the single beam is obtained.

The light utilization efficiency can be reduced by reducing the transmittance and/or the reflectivity of optical elements on the optical path. However, changing the surface finish or surface processing of the optical elements on the optical path to change the efficiency increases the cost, thereby defeating the purpose of reducing the cost of manufacturing by using the same housing.

By contrast, changing the focal length of the coupling lens 82 can change the light intensity without changing the surface finish of the optical elements. In other words, a wide range of changes in the specification can be accommodated using the same housing and common parts, except the light source and the coupling lens. In view of the above, as illustrated in FIG. 5, the housing 800 includes the plurality of coupling lens mounts 802 along the optical axis.

The coupling lens mounts 802 disposed along the optical axis direction have different shapes. For example, the diameter of the arc of the coupling lens mounts 802 differs from each other. Furthermore, the length of the coupling lens mounts 802 in the direction of optical axis also differs.

The coupling lens mounts 802 disposed along the optical axis direction have different lengths because of different focal lengths of the coupling lens 82. More specifically, in order to obtain the same traveling distance of the light beam after the light penetrates through the coupling lens 82, the coupling lens 82 needs to be moved more when the focal length is long. The same is true for the optical axis direction.

In view of the above, in order to secure the similar or the same amount of travel of the light beam after the light passes through the coupling lens 82, the diameter of the arc of the coupling lens mount 802 for the coupling lens having a long focal length is greater than the diameter of the arc of the coupling lens mount for the coupling lens having a short focal length. Similarly, the length of the bearing surface of the coupling lens mount for the coupling lens having a long focal length far from the light source is longer in the optical axis direction than that for the coupling lens having a short focal length closer to the light source.

With this configuration, the productivity can be increased by increasing the number of beams and reducing the rotation speed of the polygon scanner 85. In a case of changing the resolution, a similar, if not the same configuration as described above, can be employed.

More specifically, in an optical scanner having a resolution of 600 dpi using a single beam, when the number of beams is increased to two, the pitch between the beams is reduced by half, and the rotation speed of the polygon scanner 85 is unchanged, the resolution can be increased to 1200 dpi. In this case, the required specification for the light intensity per beam changes. However, reducing the efficiency of the coupling lens 82 allows such a change in the resolution without changing other optical elements.

As described above, providing a plurality of the coupling lens mounts 802 with different shapes (sizes) along the optical axis direction in the first optical system secures the traveling distance of the light beam after the light beam passes through the coupling lens.

With this configuration, off-the-shelf or standardized parts including the polygon scanner 85 can be utilized regardless of a change in the specification. Furthermore, a wide range of parts including the housing can be used unchanged or modified, regardless of a change in the specification so that a new polygon scanner, a new housing, and so forth to accommodate the specification change do not need to be manufactured, thereby preventing cost increase.

Figure 6:
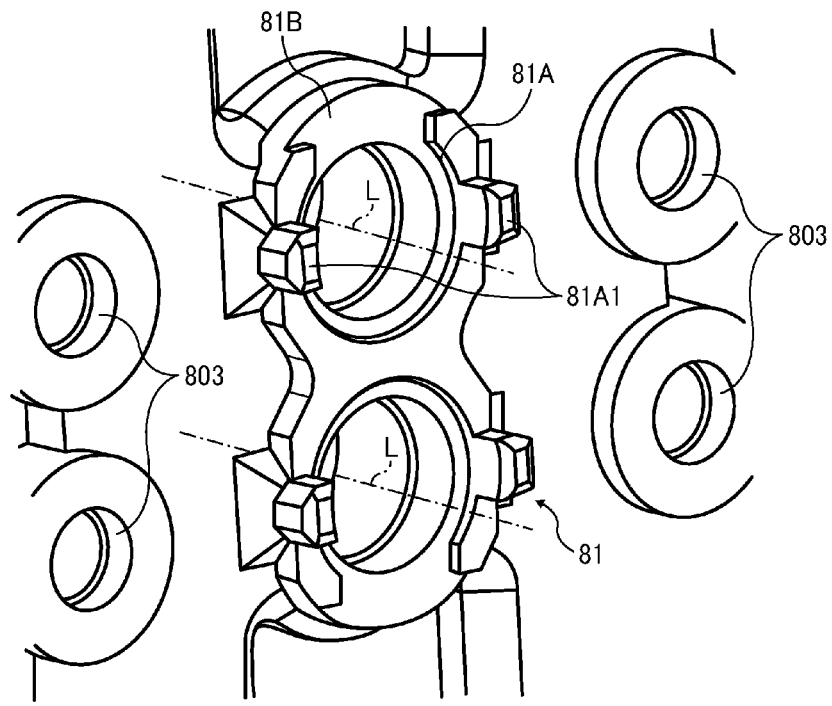
FIG. 6 is an enlarged schematic diagram illustrating the light source mount illustrated in FIG. 4.
Figure 7:
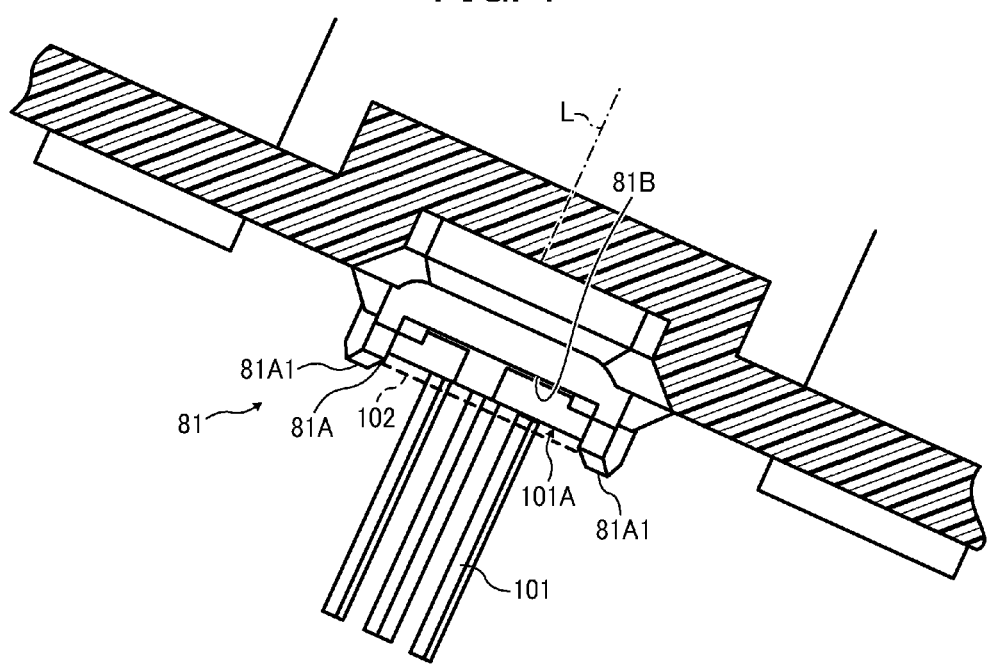
FIG. 7 is a cross-sectional view schematically illustrating the light source mounted on the light source mount of FIG. 6.

With reference to FIGS. 6 and 7, a detailed description is provided of the light source attachment portion shown in FIG. 4. FIG. 6 is a partially enlarged schematic diagram illustrating the light source mount illustrated in FIG. 4. FIG. 7 is a cross-sectional view schematically illustrating the light source 101 mounted in the light source unit 81 of FIG. 6.

The light source unit 81 includes a positioning member 81A and a contact surface 81B. The positioning member 81A positions the light source 101 in place in the direction perpendicular to the optical axis. The contact surface 81B contacts an edge of the light source 101 at the light projecting side thereof in the direction of the optical axis (an extension of the optical axis indicated by the line L).

The positioning member 81A is formed substantially in the shape of an arc of a circle in cross section, that is, a circular arc as viewed from the optical axis direction at one side. The outer diameter of the positioning member 81A is greater than the outer diameter of the light source 101 in the direction perpendicular to the optical axis. With this configuration, the light source 101 can rotate in the positioning member 81A, thereby allowing adjustment of the beam pitch corresponding to the number of beams, and hence positioning the light source 101 in place.

The positioning member 81A projects from a surface of the housing 800 forming a wall surrounding the light source 101, and the bottom portion of the positioning member 81A at the housing side constitutes a planer surface serving as the contact surface 81B that contacts the edge surface of the light source 101 at the light projecting side. The contact surface 81B is formed by a difference in dimensions of the inner circumferential surface of the light projecting opening and the inner circumferential surface of the positioning member 81A.

After the edge surface of the light source 101 at the light projecting side contacts the contact surface 81B, as illustrated in FIG. 7, the light source attachment member 102 is fastened to the housing 800 using the screw 103, thereby pressing a pressing portion 101A of the light source 101 at the opposite side to the light projecting side against the contact surface 81B. Accordingly, the light source 101 is fixed to the housing 800.

The positioning member 81A includes a guide portion 81A1 which is a wall extending along the optical axis direction at the opposite side to the light projecting side of the light source 101. The guide portion 81A1 is disposed at two positions of a circumference of the positioning member 81A facing each other with the center of the cross section of the arc shape of the positioning member 81A interposed therebetween. The guide portions 81A1 form a rib.

The leading edge of the inner circumference of the guide portion 81A1 is chamfered, thereby facilitating insertion of the light source 101. It is to be noted that the number of guide portions 81A1 is not limited to two. More than two guide portions 81A1 may be disposed along the circumference of the positioning member 81A depending on the difficulty in guiding the light source 101. It is to be noted that the reference number 803 indicates a fastening portion by the screw 103.

In this configuration, when increasing the number of beams in the optical scanner using a single beam as a standard configuration, the number of the coupling lens 82 can be increased to correspond to the number of the light sources.

Upon installation of the coupling lens 82, the coupling lens mount 802 is selected from the plurality of the coupling lens mounts 802 disposed along the optical axis direction. After adjustment of the optical axis on the selected coupling lens mount 802, the coupling lens 82 is fixed thereto by curing the ultraviolet curable resin through ultraviolet radiation. Accordingly, the coupling lens 82 is reliably fixed to the housing 800.

In the light source unit 81, upon installation of the light source 101, the light source 101 is guided along the guide member 81A1 of the positioning member 81A towards the contact surface 81B. The outer circumferential surface of the light source 101 faces the inner circumferential surface of the positioning member 81A.

Since the outer diameter of the positioning member 81A is greater than that of the light source 101, the light source 101 mounted in the positioning member 81A can be rotated therein to adjust and determine the beam pitch. Subsequently, the light source support member 102 is fastened to the housing 800, thereby fixing the light source 101 to the housing 800.

According to the illustrative embodiment as described above, in a case in which the number of beams needs to be changed due to a change in a specification, the focal length of the coupling lens 82 disposed in accordance with the change in the number of light sources can be changed, thereby optimizing the light intensity. With this configuration, regardless of changes in the specification, the same optical housing can be used, thereby reducing cost for manufacturing the new housing for the specification change.

The foregoing description pertains to the first optical system including components from the light source 81 to the polygon scanner 85. As illustrated in FIGS. 1 and 2, in the image forming apparatus 100 the light beam projected from the polygon scanner 85 is reflected and directed by the scan lens and the reflection mirrors towards the photosensitive drum 20.

As illustrated in FIG. 3, the housing 800 that houses components from the light source unit 81 to the scan lens 86 constitutes a first housing. A housing that houses the reflective mirror disposed on the optical path after the scan lens constitutes a second housing. The first housing is disposed in the second housing, thereby constituting a second optical scanner that directs a scan light to the photosensitive drum 20.

In this configuration, the light source unit 81 and the coupling lens mount 802 can be selectable in the first housing to accommodate changes in a specification. In addition to the housing 800 and the polygon scanner 85 disposed in the housing 800, the second housing can be used without any change despite changes in the specification. Accordingly, a wide range of common parts can be utilized.

Furthermore, the illustrative embodiment of the present invention is advantageous for procurement of parts upon recycling. More specifically, changes in the specification can be accommodated without replacing many parts while utilizing a wide range of common parts.

In terms of recycled image forming apparatuses, the specification including productivity of image forming apparatuses to be recycled is limited to the specification of the image forming apparatuses being collected for recycle. In other words, the collected image forming apparatuses are recycled without any specification change. However, the recycled machine does not necessarily have the configurations desired by users.

In view of the above, according to the illustrative embodiment, the productivity of the image forming apparatus can be changed by changing the light source when replacing the light source having reached its product life cycle. With this configuration, the recycled machine can accommodate desired configuration changes.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising
a light source configured to project a light beam against a target;
a deflector configured to deflect the light beam projected from the light source;
a coupling lens configured to direct the light beam projected from the light source to the deflector;
an optical element configured to focus the light beam deflected by the deflector into a desired shape;
a light source support member configured to support the light source; and
a housing configured to house the light source supported by the light source support member, the deflector, and the optical element, the housing including at least two coupling lens mounts on which the coupling lens is fixable, the at least two coupling lens mounts being i) arranged on and extending parallel to a bottom surface of the housing, and ii) spaced apart from one another along a same direction as an optical axis of the light beam traveling between the light source and the target such that the light beam travels over the at least two coupling lens mounts, and,
wherein the light source is one of a plurality of light sources in the housing, the housing is configured to accommodate multiple light source support members that allow for the plurality of light sources to be arranged in a direction that is perpendicular to the optical axis of the light beam, and the coupling lens is fixable to one of the at least two coupling lens mounts using an adhesive agent after the optical axis of the light beam is aligned.

2. The optical scanner according to claim 1, wherein the coupling lens is fixed to the one of the at least two coupling lens mounts using an ultraviolet curable adhesive agent.

3. The optical scanner according to claim 1, wherein the coupling lens mounts are formed substantially in the shape of circular arc in cross section having different diameters.

4. The optical scanner according to claim 1, wherein the coupling lens mounts have different lengths in the optical axis direction, and the length of the coupling lens mount disposed proximal to the light source is less than the length of the coupling lens mount disposed distal to the light source.

5. The optical scanner according to claim 1, wherein the housing further comprises a light source mount including a positioning portion formed substantially in the shape of circular arc in cross section to position the light source in place in the direction perpendicular to the optical axis, and the diameter of the positioning portion is larger than an outer diameter of the light source in the direction perpendicular to the optical axis.

6. The optical scanner according to claim 5, wherein the light source mount includes a contact surface that contacts a light projecting surface of the light source in the direction of the optical axis of the light source, and the light source contacting the contact surface is pressed against the contact surface by the light source support member and fixed to the light source mount.

7. The optical scanner according to claim 5, wherein the positioning portion includes a guide member on the circumference of the arc of the positioning portion, the guide member extending in the direction of the optical axis at the side opposite the light projection side of the light source,
wherein the guide member guides the side portion of the light source pressed by the light source support member to position the light source in place in the direction perpendicular to the optical axis upon installation of the light source on the positioning portion.

8. The optical scanner according to claim 7, wherein the positioning portion includes at least two guide members disposed facing each other on the circumference of the arc of the positioning portion with the center of the arc of the circle interposed therebetween.

9. An image forming apparatus, comprising:
a latent image bearing member configured to bear an electrostatic latent image on a surface thereof;
the optical scanner of claim 1 configured to write the electrostatic latent image on the latent image bearing member;
a developing device configured to develop the electrostatic latent image with toner to form a toner image; and
a transfer device configured to transfer the toner image on a recording medium.

10. An optical scanner, comprising:
a light source configured to project a light beam against a target;
a coupling lens configured to direct the light beam projected from the light source to a deflector;
a housing configured to house the deflector and the light source supported by a light source support member, the housing including at least two coupling lens mounts on which the coupling lens is fixable, the at least two coupling lens mounts being arranged on and extending parallel to a bottom surface of the housing, and spaced apart from one another along a same direction as an optical axis of the light beam traveling between the light source and the target such that the light beam travels over the at least two coupling lens mounts, and,
wherein the coupling lens is fixable to one of the at least two coupling lens mounts using an adhesive agent after the optical axis of the light beam is aligned.

11. The optical scanner of claim 10, wherein the light source is included in a plurality of light sources, the housing is configured to accommodate multiple light source support members that allow for the plurality of light sources to be arranged in a direction that is perpendicular to the optical axis of the light beam, and the coupling lens is fixed to the one of the at least two coupling lens mounts based on a focal length of the coupling lens.

* * * * *